(12) United States Patent
Shin et al.

(10) Patent No.: US 12,407,733 B2
(45) Date of Patent: Sep. 2, 2025

(54) AUTOMATED FRAMEWORK FOR MONITORING OPT-OUT SETTINGS

(71) Applicant: THE REGENTS OF THE UNIVERSITY OF MICHIGAN, Ann Arbor, MI (US)

(72) Inventors: Kang G. Shin, Ann Arbor, MI (US); Hoang Duc Bui, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 159 days.

(21) Appl. No.: 18/379,282

(22) Filed: Oct. 12, 2023

(65) Prior Publication Data
US 2024/0137389 A1    Apr. 25, 2024

Related U.S. Application Data

(60) Provisional application No. 63/415,813, filed on Oct. 13, 2022.

(51) Int. Cl.
*H04L 9/40*     (2022.01)
*G06F 40/205*   (2020.01)
*H04L 67/50*    (2022.01)

(52) U.S. Cl.
CPC ............ *H04L 63/20* (2013.01); *G06F 40/205* (2020.01); *H04L 67/535* (2022.05)

(58) Field of Classification Search
CPC ...... H04L 63/20; H04L 67/535; G06F 40/205
See application file for complete search history.

(56) References Cited

U.S. PATENT DOCUMENTS

| | | | |
|---|---|---|---|
| 2010/0024032 A1* | 1/2010 | Britton | G06Q 30/02 709/224 |
| 2016/0205208 A1* | 7/2016 | Yang | H04L 67/535 709/224 |

* cited by examiner

*Primary Examiner* — Bryan Y Lee
(74) *Attorney, Agent, or Firm* — Harness, Dickey & Pierce, P.L.C.

(57) ABSTRACT

A computer-implemented method is presented for detecting non-compliance with an opt-out decision of a user. The method includes: identifying select statements of a privacy policy for an online tracking entity by analyzing webpages associated with the online tracking entity, where the select statements specify data practices in response to an opt-out decision; detecting transfer of cookies from a web browser to a server, where the cookies are transferred after an opt-out decision by the given user and the server is associated with the given online tracking entity; analyzing content of the detected cookies in relation to the select statements of the privacy policy; and notifying the given user of a violation of the privacy policy in response to determining an inconsistency between the content of the detected cookies and the select statements of the privacy policy.

18 Claims, 2 Drawing Sheets

---

In order to be excluded from third party tracking, you can click the following button. This will set a cookie with the name "atboptout" from the domain "adtriba.com", the opt-out is valid as long as the cookie is not deleted.

OPT-OUT FROM TRACKING

Opt-out Cookie set: YES

In order to be excluded from third party tracking, you can click the following button. This will set a cookie with the name "atboptout" from the domain "adtriba.com", the opt-out is valid as long as the cookie is not deleted.

OPT-OUT FROM TRACKING

Opt-out Cookie set: YES

AUTOMATED FRAMEWORK FOR MONITORING OPT-OUT SETTINGS

CROSS-REFERENCE TO RELATED APPLICATIONS

This application claims the benefit of U.S. Provisional Application No. 63/415,813, filed on Oct. 13, 2022. The entire disclosure of the above application is incorporated herein by reference.

FIELD

The present disclosure relates to an automated framework for monitoring opt-out settings.

BACKGROUND

Figure 1:
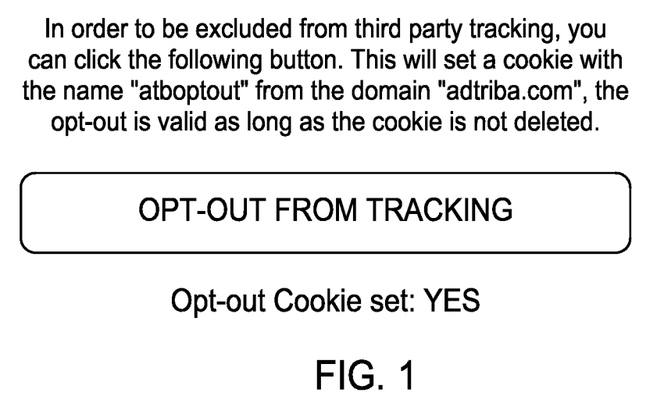
FIG. 1 depicts an example of an opt-out setting and policy statement.

Online trackers, such as ad platforms and analytics service providers, leverage various tracking techniques to collect users' browsing history across websites, posing serious privacy concerns to users and regulators. As a result, the trackers' privacy policies often provide users with an opt-out link or button to reject targeted advertisements and/or their data collection. FIG. 1 shows an example where an ad platform states to stop tracking users via unique-identifier cookies after the user opts out.

Inconsistencies between a stated opt-out policy and its actual tracking behavior pose high privacy risks to users since the data collection occurs/continues even after they opt out, contrary to their expectation. These inconsistent privacy practices can also be deemed deceptive and illegal by regulators. Federal Trade Commission (FTC) has fined several ad networks for their short-lived opt-out cookies, deceptive policy statements about a complete cookie opt-out, and falsified statements on browser cookie settings. Therefore, checking (in)consistencies between the stated privacy policies and the corresponding data practices is important as it benefits all of users, companies and regulators; users will be reassured of their privacy protection, regulators can prevent trackers' deceptive mechanisms, and tracker companies will be forced to comply with their stated privacy policies.

The main research question to answer is then: Do opt-out settings really opt users out of an online tracker's data practices as stated in its opt-out policy? To answer this question, this disclosure addresses the following three challenges that originate from the complexity and vagueness of the opt-out policies specified in legal language and the variability of non-standardized opt-out links/buttons. First, the semantic extraction and analysis of opt-out policy statements are difficult due to the complexity of website user interface and the legal language used in privacy policies. Second, analyzing the data collection and tracking behavior requires activating an opt-out choice, extracting data flows and inferring data-usage purposes of trackers after the opt-out setting is enabled. Finally, verifying (in)consistencies between the opt-out policies and the data-collection practices needs to reconcile the different levels (i.e., high vs. low) of granularity between the policy statements and data flows.

Unlike prior work on the opt-out choices provided by content-publishing websites, this disclosure studies trackers' opt-out of tracking services as third-parties on the content websites. Prior work has mainly studied the usability of opt-out choices and the extraction of generic opt-out hyperlinks on content-providing websites, rather than direct opt-out settings of online trackers. A recent study of compliance of cookie banners does not apply to the cookies on websites other than those hosting the banners, thus covering a different scope from this disclosure. Moreover, none of the prior studies have checked the (in)consistencies between the opt-out settings and the corresponding policy statements. They assumed that trackers always honored users' opt-out preferences once the opt-out cookies were set.

To fill these gaps, an automated framework is presented that analyzes (in)consistencies between opt-out policy statements and the corresponding data practices of online trackers. This framework is referred to herein as the OptOutCheck system.

First, given a tracker's website, the OptOutCheck system automatically discovers its opt-out buttons/links that record a user's preference of opting out of the service's tracking and data collection. From the sentences next to an opt-out button, the OptOutCheck system extracts the policy statements about the privacy practices for opted-out users (called opt-out policies). It identifies five classes of opt-out policies, such as No-tracking and No-data-collection, by analyzing the semantic arguments, syntactic dependencies and text patterns of the policy sentences. For example, a tracker may not use unique-ID cookies to track an opted-out user.

Second, the OptOutCheck system extracts the data flows from a user's browser to a tracker's servers after the user activates the opt-out choices. To this end, the system simulates a user's click on opt-out buttons, identifies opt-out cookies and determines the cookie domains enforced by the opt-out policies. OptOutCheck then identifies the tracking and data-collection behavior by analyzing the data types and usage-purposes of the key-values sent via cookies and URL parameters to the tracker's servers after an opt-out.

Finally, the OptOutCheck system formalizes policy statements, data flows and subsumptive relationships of data types to define the condition under which a data flow is consistent with a privacy policy. Logical rules are derived to check the satisfaction of this condition based on the opt-out policy classes and the data types in the data flows to detect flow-to-policy inconsistencies. Inspired by the soundness of dynamic analysis tools in software testing, this disclosure aims to minimize false positives (i.e., maximize the precision) so that the reported inconsistencies should always be true positives. In a large-scale study, the OptOutCheck system found multiple inconsistencies of popular online trackers which are manually verified, demonstrating the system's scalability and effectiveness.

This section provides background information related to the present disclosure which is not necessarily prior art.

SUMMARY

This section provides a general summary of the disclosure, and is not a comprehensive disclosure of its full scope or all of its features.

A computer-implemented method is presented for detecting non-compliance with an opt-out decision of a user. In some instances, the user may have already interacted with an online checker to provide an opt-out decision. In such cases, the method includes: identifying select statements of a privacy policy for a given online tracking entity by analyzing webpages associated with the given online tracking entity, where the select statements specify data practices in response to an opt-out decision; detecting transfer of one or more cookies from a web browser operated by the given user to a server, where the one or more cookies are transferred after an opt-out decision by the given user and the server is associated with the given online tracking entity; analyzing content of the one or more detected cookies in relation to the select statements of the privacy policy; and notifying the given user of a violation of the privacy policy in response to determining an inconsistency between the content of the one or more detected cookies and the select statements of the privacy policy.

In other instances, the user's opt-out choice is simulated. In these instances, the detection method begins with detecting a user interface element on a webpage associate with a given online tracking entity, where the user interface element enables a user to opt-out of having data collected by the given online tracking entity; and performing an opt-out for a given user using the detected user interface element.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 2:
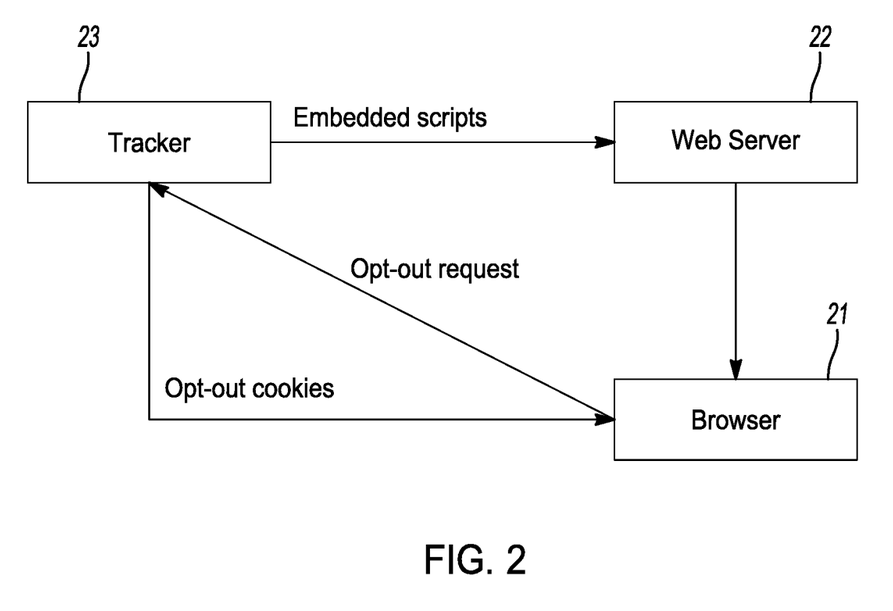
FIG. 2 is a diagram showing the data flows to and from an online tracking entity.

Trackers are the companies that collect information about users who browse the web. The most common types of trackers are advertisers and data analytics services that collect user data to create online behavioral advertising (OBA). Other types of trackers are site analytics and social media who track users to understand the patterns of users' activity for the website to improve and provide services. With reference to FIG. 2, this disclosure considers data flows among users, trackers and publisher websites. When a user accesses a content-providing website, content is loaded by a web browser 21 from a web server 22. In addition to the content, the browser 21 also loads cookies and scripts from a tracker 23. Trackers offer users opt-out choices on their websites so that they can request not to track or collect their data.

The most common online tracking technology used in practice and stated in privacy policies is the HTTP cookies placed on users' devices. Members of Digital Advertising Alliance (DAA) in USA and Canada agree not to use Flash and similar local-storage-based tracking tools unless an opt-out mechanism is publicly provided. There are also other advanced web tracking mechanisms that are harder to detect, such as canvas fingerprinting, ever cookies, and cookie syncing.

Third-party cookies are the cookies in domains other than those of the websites being accessed regardless of domain ownership. The term "domain" is used to indicate a pay-level domain that a consumer or business can directly register, and is typically a subdomain followed by an effective top-level domain (public suffix). The effective top-level domains are extracted by using tldextract library.

Placing anonymous opt-out cookies in the users' web browsers to signal their choices is the de facto mechanism used by trackers. It is possible to have a persistent identifier for opt-out purposes, but trackers can now easily track users who contradict the purpose of opt-out. Many trackers' privacy policies even describe their opt-out mechanisms explicitly, such as 'this will set a cookie with the name "atboptout" from the domain "adtriba.com"' as depicted in FIG. 1. Furthermore, tracking blocking tools, such as those of Network Advertising Initiative (NAI), DAA, and Evidon Global Opt-out), use this method.

Anonymous opt-out cookies remain the most common opt-out mechanism for advertisers and were explicitly described in the privacy policies surveyed, and hence this disclosure only consider cookie-based tracking and opt-out mechanisms. Although other forms of tracking like fingerprinting are used by trackers, a recent study found that fingerprinting is not stable owing to the changes of user fingerprints over time, so trackers even employ cookie re-spawning to enable reliable tracking of users. Another opt-out mechanism uses server-side storage to store the users' consents on the server side. It requires a long-term ID for each user, such as the user's ID or email address, and needs to perform synchronization between server-side consent storage and cached local cookies on the user's browser. This opt-out mechanism is outside of the scope of this disclosure.

Figures 3, 4, 5:
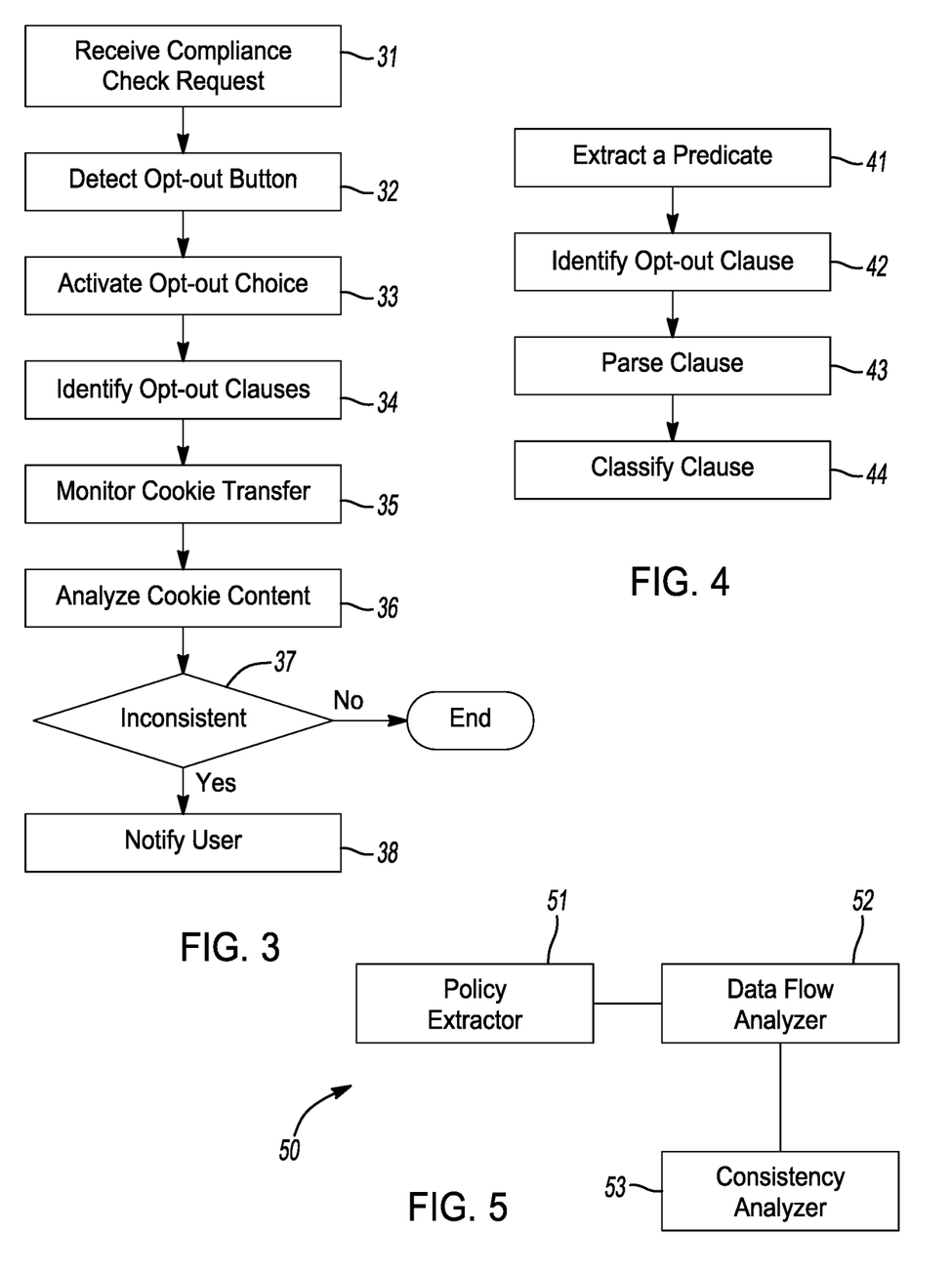
FIG. 3 is a flowchart illustrating an automated technique of detecting non-compliance with an opt-out decision of a user.
FIG. 4 is a flowchart illustrating an example method for classifying opt-out policy clauses of a privacy policy.
FIG. 5 is a diagram depicting an example implementation of an opt out checking system.

FIG. 3 depicts an automated technique for detecting non-compliance with an opt-out decision of a user. As a starting point, a request is received at 31 from a given user to check compliance of their opt-out decisions, where the opt-out decision pertains to a particular online tracking entity. In response to receiving the request, a series of steps are undertaken to determine compliance or non-compliance with the user's opt-out decision. In an example embodiment, each step is implemented by computer-executable instructions executed by one or more computer processors of a computing device.

First, select user interface elements on webpages associated with the online tracking entity are searched and identified at 32, where the select user interface element enables a user to opt-out of having data collected by the given online tracking entity. Example user interface elements may include but are not limited to buttons, hyperlinks or other HTML elements. The user interface elements are preferably detected based on attribute values of HTML elements as will be further described below.

In one embodiment, the opt-out decision by the user is simulated at 33 using one of the detect user interface elements. For example, to activate the opt-out-choice, the system attempts to click the opt-out button candidates until an opt-out cookie is detected or a maximum number of candidates (e.g., 5) have been tried. If clicking a link does not create an opt-out cookie, the crawler returns to the original page and tries the next candidate button. To reduce the number of link-clicks, the system ranks the opt-out button candidates based on the classifier's confidence (i.e., the classification probability). The system prioritizes the matched patterns on the displayed text content which is a user-facing feature. Furthermore, the system excludes the candidates based on the URLs that are informational opt-out web pages commonly used by trackers or industrial opt-out tools, such as the DAA and NAI websites. Similarly, hyperlinks that points to the currently visiting page are also removed.

In some embodiments, the user may have already interacted with the website of the online checker to provide an opt-out decision. In this case, the steps of searching for opt-out buttons and simulating an opt-out choice may be skipped and processing may start with analyzing the privacy policy of the online tracking entity.

Privacy policies for the online tracking entity are analyzed as indicated at 34. More specifically, opt-out policies can be extracted automatically from the web pages of the online tracking entity. Opt-out policies are select statements in the privacy policy that specify data practices in response to a user's opt-out decision.

Once the opt-out policies are known, the system can monitor at 35 the cookies transferred from a web browser operated by the user to a server associated with the particular online tracking entity. It is understood that the cookies being monitored are transferred after the user has made their opt-out choice or after the opt-out choice has been simulated. The content of the detected cookies are in turn analyzed at 36 in relation to the opt-out statements of the privacy policy. More specifically, a determination is made as to whether the content of the detected cookies is inconsistent with the opt-out statements. For example, a cookie that contains a unique user identifier for the given user would be inconsistent with a no tracking policy. In another example, a cookie that contains any user data (such as unique user identifier, user location, web page URLs and/or IP address) would be inconsistent with a no data collection policy. These are merely illustrative of two types of inconsistencies which could occur within the scope of this disclosure.

In response to determining an inconsistency between the content of a detected cookie and the opt-out statements, the given user can be notified at 38 of a violation of the privacy policy. The notification can include information about the online tracking entity, the privacy policy and the type of violation that occurred. Additionally, the notification could be sent to the online tracking entity or a governmental regulatory agency. In some embodiments, the system proactively deletes the detected cookies from the computing device hosting the user's web browser. It is to be understood that only the relevant steps of the methodology are discussed in relation to FIG. 3, but that other software-implemented instructions may be needed to control and manage the overall operation of the system.

To detect UI elements that enables a user to opt-out, a crawler is developed that automatically visits web pages, performs user interaction and records HTTP cookies set by both JavaScript and HTTP responses. The crawler is set up to use a university-based vantage point and user-behavior-emulating browser configurations to reduce measurement bias as websites containing trackers may behave differently when they detect a visitor to be a bot. Specifically, the crawling is conducted in an 8-node computing cluster located in a US university network. The crawler is built upon Playwright that automates the Google Chrome web browser and emulates realistic human browsing behavior to circumvent trackers' bot-protection mechanisms.

Each web page visit waits until there is no network activity for at least 0.5 second or a 30-second timeout expires, which is a common heuristic used by web automation tools for loading dynamic web pages. Furthermore, if the loading fails, to avoid transient network errors, the web page load was retried at most three times with a 2-minute waiting time between two retries.

FIG. 5 depicts an example implementation for an OptOutCheck system 50. The OptOutCheck system is comprised generally of: a policy extractor 51, a data flow analyzer 52 and a consistency analyzer 53. In this example, the policy extractor 51, the data flow analyzer 52 and the consistency analyzer 53 are implemented by computer executable instructions executed by a computer processor, for example on the computer hosting the web browser. It is also envisioned that one or more of these components can be off-loaded to another computing device. Each of these components are further described below.

The policy extractor 51 detects a user interface element on a webpage associate with a given online tracking entity, where the user interface element enables a user to opt-out of having data collected by the given online tracking entity. An opt-out activation button (also called opt-out button) is defined as a clickable HTML element that, upon its click, will record the user choice/preference of opting out of the trackers' services. Similarly, an opt-out page is a web page that contains an opt-out button. Such pages can be an iframe embedded in another web page. Furthermore, while many websites instruct users to use opt-out tools providing self-regulatory groups, such as NAI and DAA, the OptOutCheck system does not analyze them because these tools do not contain any specific definition of a tracker's opt-out. Moreover, members of these groups frequently provide their own definitions of opt-out which are usually stricter than the minimum requirements of NAI and DAA.

Given a tracker domain, the policy extractor 51 of the OptOutCheck system 50 uses a three-stage pipeline to extract its opt-out button. The policy extractor 51 first identifies the candidate web pages that may contain an opt-out button or a link to an opt-out page by searching for keywords related to "opt out" in the entire website. The system then detects opt-out button candidates from the web pages. Finally, the system validates opt-out buttons by extracting the opt-out cookies after clicking the candidate buttons.

As trackers have incentives to keep users from opting out of their tracking, they tend to make it difficult to detect opt-out pages of their websites. The opt-out pages can be placed deep down in the website's hierarchy with very few links to the pages. For example, an ad platform website may have multiple policies, such as privacy and cookie policies, but only one of them has a hyper link that points to an opt-out page. Another challenge is to search websites that support multiple languages where the links to switch the language must be discovered.

Because checking the availability of an opt-out page requires exhaustive crawling of the whole website, this disclosure leverage search engines that systematically index web pages of trackers' websites to find opt-out page candidates. Although search engines may not crawl all websites in real time, the privacy policies and opt-out links do not change very frequently. Finally, the results in this step are refined further in other detection steps in the OptOutCheck's pipeline, thus avoiding/minimizing potential false positives.

In one embodiment, a query term is derived for Google Programmable Search Engine to search for the web pages that contain keywords related to the opt-out of trackers' websites. Specifically, the query term is "opt out opt-out site:<tracker-domain>", where the <tracker-domain> is substituted for the website domain of a tracker, such as site: adblade.com. The query includes opt out without any quote to search for variations of opt out such as opted out or opting out. The term "opt-out" helps detect opt-out pages with that term appearing on their URLs instead of their contents. The search engine then looks for these "opt out" variations and the exact "opt-out" term in both URL and website's content.

The query is designed to have better coverage rather than maximizing precision because the later steps in the pipeline (e.g., opt-out button detection) will filter out unrelated non-opt-out pages. So, the query term avoids restricting the search with the exactTerms or orTerms parameters. Using a minimum number of customized parameters is preferred as using more parameters is found to make the output results less stable over time. For example, restricting to English-only web pages produced no results in some query executions. The Google search may still miss web pages, but it will only increase false negatives (i.e., no detection of opt-out buttons) without increasing false positives (i.e., incorrect detection).

The extraction performance is evaluated on trackers that are known to have opt-out buttons on their websites. Specifically, 100 trackers were randomly selected from the Evidon Global Opt-out list, excluding trackers' opt-out pages that were not accessible, possibly due to the outdated opt-out-page URLs in the Evidon database. Finally, opt-out pages of 43 trackers were extracted to create the dataset.

It was observed that the search engine is effective in finding the opt-out pages. The opt-out pages are included in the top-1 and top-3 results in 34/43 (79.07%) and 40/43 (93.02%) of the search queries, respectively. There are three cases where the search engine could not detect the opt-out pages. A website places its privacy policy in PDF where the opt-out link is not clickable. Another non-English tracker uses "don't track" instead of "opt out" keyword. Finally, one website disallows crawling of its privacy policy using robots.txt specification), thus preventing search engines and automated web crawlers from detecting the opt-out button placed in the privacy policy. Because the results lower than the top 3 did not improve the opt-out page detection, OptOutCheck system uses only the top-3 results from the search engine for a further analysis.

In an example embodiment, a classifier is used to extract opt-out button candidates. Patterns are derived by following the Snowball bootstrapping procedure which has been widely adopted for extracting information in web and mobile environments. Specifically, construct patterns of the attribute values of the HTML elements that represent opt-out buttons. A key step is that after each iteration, only the most reliable rules are kept for the next iteration. Therefore, the set of extraction rules improves as it iterates. This is detailed in Algorithm 1 below.

---

Algorithm 1 OptoutCheck's bootstrapping procedure for extracting opt-out buttons from a large corpus of web pages.

1: Initialize E to a set of seed extraction rules
2: While E does not grow
3:   Use the rule set E to detect opt-out buttons
4:   Generate new rules based on the detected buttons
5:   Keep only reliable rules; the resulting rule set is E'
6:   Set E = E'
7: Output: a set of rules to extract opt-out buttons

---

Let E be a set of extraction rules where each rule e∈E is a tuple of (element-selector, attribute, value pattern) that matches the value pattern with the value of an attribute of the elements selected by the CSS element-selector. In these tuples, the attribute is an HTML tag's attribute or text content. To avoid mixed effects on different types of HTML elements, each of the rules applies on one tag and one attribute. Specifically, an element-selector is a CSS selector that selects only one type of HTML element rather than a list that selects multiple different HTML tags. Similarly, an attribute denotes a single attribute of an HTML element rather than a list of attributes. The value pattern can be a regular expression or a function that performs complex matching on the value of the element's attribute. An example rule is ('a', text-content, '^opt[-]out') that matches any anchor element (i.e., hyperlinks) with text content starting with either "opt-out" or "opt out". The regular expression matching is case-insensitive to handle varied capitalization in the opt-out button's labels. An element's text content represents only a human-readable text, not invisible elements.

The seed set contains 4 rules to extract elements a, button, input and span with text content starting with "opt out" or "opt-out". These HTML tags are commonly used to implement buttons in web pages. As in prior research, it was observed that the seed rule set does not significantly affect the final rules if the matching frequency thresholds are tuned properly.

Following the bootstrapping algorithm, patterns were added that use id, class, value, onclick and href of these elements. The final extraction rule set contains 14 rules with a frequency cutoff threshold of 10 (i.e., the rules with less than 10 matches are excluded). Two patterns are used: starting with "opt out" variants and contain the "opt out" function identifier (e.g., "optoutToggle"). The matching patterns use dashes, underscores and spaces as the delimiters.

Next, the automated extraction of opt-out policies from the opt-out web pages of trackers is described in more detail. That is, the policy extractor 51 further operates to select statements of a privacy policy for the given online tracking entity by analyzing webpages associated with the given online tracking entity, where the select statements specify data practices in response to an opt-out decision. Consider an opt-out statement to be equivalent to a negative-sentiment statement, i.e., a statement "opt out of S" is equivalent to "not S after opt-out" where S is a statement about data collection. For example, "you can opt out of receiving targeted ads" is equivalent to "you will not receive targeted ads after opt-out."

Due to the ambiguity of language in privacy policies, the following interpretation of common opt-out statements is made. Assume "no tracking" to indicate that user data can still be collected but will not be associated with the device, such as by using unique-ID cookies. Tracking can be defined as "collecting data over multiple different web pages and sites, which can be linked to individual users via a unique user identifier". In addition, since a cookie is always sent to its ad provider's server whenever the browser makes a request to the server, if the advertiser states that it will stop placing cookies on the user's browser (except for the opt-out preference cookies), or the user can opt out of the advertiser's cookies, interpret it to be equivalent to "stop data collection". Finally, interpret "targeting" term to be equivalent to "targeted advertising," so "opting out of targeting" means that interest-based advertising will not be displayed to the users.

The statements in privacy policies are formalized as follows to analyze the (in)consistencies between privacy policies and actual data-collection behavior.

Definition 5.1 (Policy Statement). A policy statement is a pair (dc, du) where dc represents data collection and du is data usage. dc=(r,c,d) denotes whether a receiver r does or does not collect (c∈{collect, not_collect}) a data object d. du=(d,k,p) represents whether a data object d is used for or not for (k∈{for, not_for}) a data usage purpose p of the receiver.

Definition 5.2 (Semantic Equivalence). x and y are semantically equivalent, denoted as $x \equiv_o y$, if and only if they are synonyms defined under an ontology o. Similarly, $x \not\equiv_o y$ denotes nonequivalent concepts in an ontology o.

A policy statement only captures the semantics of the sentences that describe data collection, sharing or use. Other policy sentences that do not specify explicit data practices, such as "we will stop showing targeted advertising", are not modeled since it is unclear which data is collected or used. The data usage du can be a special value None, indicating that the usage purpose is not specified.

In order to analyze the (in)consistencies between opt-out policies and data practices, the policy statements are categorized according to their stated data practices and purposes. Consider five types of opt-out policies: no tracking (No-tracking), no data collection (No-data-collection), no data collection for targeted advertising purposes (No-data-collection-for-oba), no displaying online behavioral advertising (No-display-oba) and other. The Other class includes samples that do not belong to any other classes such as opt-out of the sale of information, stop receiving marketing emails/text messages, and opt-out instructions.

The opt-out policy taxonomy covers two main types of data practices, user-activity tracking and user-data collection, while a data practice's purpose is either for delivering OBA or unspecified. However, the No-tracking class is not divided further based on the data-usage purpose because a statement about tracking is seldom coupled with data-usage purposes.

Using the definitions above, the opt-out policy classes are formalized in such a way that each policy class comprises policy statements that have semantically equivalent terms. For example, No-tracking class is a set of policy statements in the form (r, collect, id_data), (id_data, not_for, tracking) where id_data can be substituted by a synonym such as "unique identifier" and r can be a synonym of "first party". Of the opt-out policy classes, statements about stopping displaying online behavioral advertising (No-display-oba) are not formalized for the flow-to-policy consistency analysis because they do not explicitly express any data collection. The opt-out policy classes and the corresponding privacy-statement sets are listed in Table 1 below.

TABLE 1

Opt-out policy classes and the corresponding sets of policy statements. In the policy statement sets, data type id_data ≡ δ "unique identifier", d ≡ δ "data", and receiver r ≡ δ "first party" under an ontology δ. "oba" stands for online-behavioral advertising.

| Opt-out Policy Class | Policy Statement Set |
| --- | --- |
| No-tracking | {((r, collect, d), (d, not_for, tracking)} |
| No-data-collection | {((r, not_collect, d), None)} |
| No-data-collection-for-oba | {((r, collect, d), (d, not_for, targeted_ad))} |

In an example embodiment, the extraction of opt-out policies from a policy sentence is formulated as a binary classification problem. For each opt-out policy class, create a classifier that determines whether a sentence expresses the opt-out policy or not. As a result, a sentence may contain one or multiple opt-out policies. For example, "to opt out of our tracking and data collection, please click the button below" contains two policies: No-tracking and No-data-collection. Other types of opt-out policies are contemplated by this disclosure.

FIG. 4 further illustrates an example method for classifying opt-out policy clauses of a privacy policy. The pipeline begins with the extraction of opt-out predicates (verbs) describing the action that a user needs to take for an opt-out as indicated at 41. The most common form of such predicates is a verb with lemma opt. In addition, the OptOutCheck system also looks for nouns with lemma opt and traverses up the dependency tree to identify the action performed on the noun. For example, in sentence "if you do not want to see OBA, please click our opt out here," opt is a noun and click is extracted.

Opt-out clauses are identified at 42 as a clause having a grammatical relationship with the predicates. The opt-out clauses can then be parsed at 43 into a set of features and the opt-out clause is classified at 44 using the set of features as explained in more detail below.

To extract the clauses that express the data-collection policies for an opted-out user, the system identifies the clauses that have one of the following grammatical roles with respect to an opt-out predicate: object, main clause, and adverbial clause. In an exceptional case, when a sentence does not have any opt-out predicate, but its context is clearly about opt-out policies (e.g., the sentence is the label of an opt-out button), the whole statement is treated as an opt-out policy clause. Table 2 lists examples of the opt-out policy clauses and their roles in a sentence.

| Grammatical Role | Example | Policy Statement | Policy Class |
| --- | --- | --- | --- |
| Object | If you can opt out of tracking and our unique cookie identifiers here. | (we, collect, data), (data, not_for, tracking) | No-tracking |
| Main clause | If you opt out, we will no longer use cookies to collect your data for targeted advertising. | (we, collect, data), (data, not_for, target ad) | No-data-coll.-for-oba |
| Adverbial clause | If you want us to stop collecting your data, please opt out here. | (we, not_collect, data), None | No-data-collection |
| No "opt" predicate | Please do NOT collect information about me using cookies and other tracking technologies. | (we_implicit, not_collect, data), None | No-data-collection |

The system primarily extracts the opt-out policy clauses from a sentence by analyzing the semantic arguments of the opt-out predicates. Specifically, the OptOutCheck system analyzes the following arguments of each opt-out predicate: object (Arg1), instrument (Arg2), adverbial (Argm-Adv), purpose (Argm-Prp) and purpose-not-cause (Argm-Pnc). A semantic argument answers questions like "who?", "did what?", "to whom?", and "for which purpose?" of an event expressed by the predicate. The definitions of these arguments are given in the OntoNotes 5 linguistic corpus.

As a complement to the semantic-role analysis, the policy extractor 51 of the OptOutCheck system analyzes the syntactic dependencies in the sentence with respect to the opt-out verbs. In particular, it searches for the main clause of each opt-out predicate by analyzing the syntactic dependency tree of the sentence. For example, the verb opt in "if you opt out" does not have any semantic arguments, and hence the OptOutCheck system looks for its main clause "we will no longer use cookies to collect your data" and treats it as an opt-out policy clause.

The OptOutCheck system classifies a sentence into the opt-out policy classes by identifying data objects, data-collection sentiment (i.e., collect or not) and advertising data-usage purposes in an opt-out policy clause. To identify the No-data-collection policy for "opt out of" phrases, the OptOutCheck system identifies negative data-collection actions on data objects in the object argument Arg1 of an opt predicate. OptOutCheck system uses a named entity recognition (NER) model to accurately extract data objects (such as cookie and unique cookie identifiers). In addition, the OptOutCheck system uses patterns of syntactic dependencies to identify data-practice noun phrases. Data-collection noun phrases such as "use of cookie" and "collection of data" are identified by searching for data objects (e.g., cookie and data) with a pobj (object of a preposition) dependency with respect to data-usage actions (e.g., "use" and "collection"). For example, "opt out of unique cookie identifiers" and "opt out of our use of information about you" are classified as No-data-collection.

Since cookies are the means of data collection, a negative-sentiment action performed on cookies is an indication of the No-data-collection policy, such as "we will stop placing cookies on your browser." The common actions on cookies are drop, place, and set. The negative sentiment of a data-collection action is indicated by the existence of a negation-modifier dependency, a Argm-Neg semantic argument, or a negative-sentiment modifier such as "no longer" and "stop".

Since the sentences in close proximity to opt-out buttons have a context related to opt-out choices, the occurrence of certain keywords is a good indicator of policy classes. Specifically, to extract No-tracking, the classifier looks for nouns and verbs related to tracking, such as tracking, identifier and disassociate. Similarly, advertising-related keywords, such as target, advertising and marketing, indicate advertising data-usage purposes. The advertising purposes also distinguish No-data-collection from No-data-collection-for-oba.

Next, a manually-annotated dataset is created as the ground truth to develop matching patterns for an opt-out policy classifier. Cookies of the top 5,000 websites in the US as of October 2020 were crawled. This selection is to ensure the privacy policies of the online trackers to be subject to the same legal and regulatory requirements, such as the Notice and Choice framework in the US. A dataset of 120 popular third-party cookie domains were selected as well. From the 180 cookie domains that were present on at least 100 websites, the top 100 third-party cookie domains and other 20 randomly selected domains from the remaining cookie domains to cover both the most popular and less popular cookie domains were chosen. The number of domains was limited by the resources needed to analyze and annotate the cookie domains.

From the selected cookie domains, one can trace back to the websites of the trackers that own the cookie domains and manually extract the opt-out buttons on each website. From the home page, one can search for the privacy policies (e.g., for the website visitors, corporate customers, and end-users) and then identify the opt-out settings contained in the policies. Since opt-out buttons were not ambiguous, this extraction was done by one advanced PhD student and took an average of 45 minutes for each domain, or 90 hours for 120 cookie domains.

Of the analyzed trackers, eighty provided opt-out choices. The most common form is single-click opt-out buttons. 76 (95.00%) of the settings have a single step, i.e., a single click, to opt out. The remaining settings need 2 steps: select an opt-out preference option and then click the submit button.

From the identified opt-out web pages, the sentences next to the opt-out buttons were selected and classified into the opt-out classes. Since privacy policy sentences were vague and complex, the classification of the sentences was done by two PhD students with no less than three years of experience in user-privacy research. It took an average of three minutes for each sentence on average, or 20 hours for both annotators. The inter-annotator agreement is 94%.

The final opt-out policy corpus contains 246 sentences in 80 trackers. No-display-oba is the most common opt-out policy with 49 (19.92%) occurrences. No-data-collection constitutes 23 (9.35%) instances. The least common policy with 18 (7.32%) samples is No-tracking. The imbalance between the opt-out policy classes and the Other class reflects the small percentage of the opt-out policy statements compared to descriptive opt-out instructions in practice. The number of sentences per opt-out policy class is listed in Table 3 below.

TABLE 3

Opt-out policy dataset. A sentence may contain multiple opt-out policies.

| Policy Class | # Sentences |
| --- | --- |
| No-tracking | 18 (7.32%) |
| No-data-collection | 23 (9.35%) |
| No-data-coll.-for-oba | 23 (9.35%) |
| No-display-OBA | 49 (19.92%) |
| Other | 139 (56.50%) |
| Total | 246 (100%) |

Using the dataset, two classifiers for No-tracking and No-data-collection policies were derived by observing the behavior of the trackers on the client side. Other classes related to online-behavioral advertising purposes are hard to verify without knowing the processing purposes on the tracker servers.

The classifiers achieved an average F1 score of 86.04% with precision≥88% on the policy corpus. The high inter-annotator agreement and the high F-1 scores demonstrate the consistency of the interpretation of the policy classes and the regularity of the sentence patterns. It is worth noting that due to the data sparsity, i.e., small number of samples per opt-out policy class, the dataset was used as a training set for developing the matching patterns.

The OptOutCheck system extracts opt-out policies from the policy statements that describe the data collection practices after a user clicks on the opt-out button. For example, as shown in FIG. 1, ad platforms would cease their tracking after the user opts out. Identifying these sentences is challenging because of the flexible design and implementation of websites.

It was observed that the opt-out policy statements are commonly placed nearby (e.g., in the surrounding paragraphs). This assumption is close to the expectation of FTC. Therefore, given an opt-out page, the OptOutCheck system converts the web page into plain text and extracts 10 sentences (5 before and 5 after) surrounding the position of the opt-out button. Furthermore, to reduce unrelated statements, except for labels of opt-out buttons, policy sentences without any "opt" predicate (e.g., opt-out, opt out and opting out) are excluded.

The OptOutCheck system uses the neural-network-based language pipelines of Spacy NLP library to parse and create the dependency trees of privacy policy sentences. The semantic arguments are analyzed by using a semantic role labeling model (SRL) of the AllenNLP library, which is based on Roberta-base contextualized word embeddings and trained on the CoNLL2012 (OntoNotes 5) large-scale natural language dataset. Finally, PurPliance was used to analyze privacy-statement parameters such as data-collection actions and data objects. To improve the data-type extraction, augment its data-object NER model with terms related to cookies that are commonly used in the privacy policies of online trackers.

To check whether a tracker's data collection practices follow its opt-out policies or not, it is necessary to determine that a user's opt-out preference has been recorded by the tracker. Since the focus is on the opt-out mechanism based on anonymous cookies, opt-out cookies defined as the cookies that online trackers use to record a user's opt-out choice. These cookies are created upon clicking an opt-out button for the trackers to enforce their opt-out data collection policies on web pages where the cookies present.

With continued reference to FIG. 5, the data flow analyzer 52 detects the transfer of one or more cookies from a web browser to a server, where the cookies are transferred after an opt-out and the server is associated with an online tracker. The consistency analyzer 52 in turn analyzes the content of the detected cookies in relation to select statements of the privacy policy. Automated extraction of opt-out cookies is necessary as privacy policies rarely include specifications of these kinds of cookies. The mapping from a tracker to cookie domains using a predefined list is also not guaranteed to be complete and up-to-date. Furthermore, a differential analysis of the cookies before and after an opt-out is not sufficient for extracting opt-out cookies because the opt-out button may redirect the user to the tracker's home page where other cookies—unrelated to opt-out cookies—are added.

In the example embodiment, the OptOutCheck system takes a hybrid approach to extract opt-out cookies where a cookie is matched with a predefined opt-out cookie registry and then an automatic classifier if not found. The exact-match approach leverages the opt-out cookie registries provided by automatic opt-out tools, such as Evidon Global Opt-out, DAA Protect My Choice, and Google Keep My Opt-Outs. Any cookie that has its name, domain and value match the registries is determined as an opt-out cookie. The extraction excludes session cookies because the tracker should remember the opt-out choices of users over multiple browsing sessions. In what follows, a classifier implemented by the data flow analyzer 52 is described that uses the pattern of a cookie's name and value to determine whether it is an opt-out cookie or not.

To develop and evaluate the opt-out cookie matching patterns, a ground-truth dataset is derived that contains the cookie names and values from the exact-match registries. Exclude cookies with a non-anonymous identifier value, which is empirically identified as a combination of 10-20 alpha-numeric characters, while keeping cookies with anonymous values that comprise only zeros and dashes. This process resulted in 928 opt-out cookies from 795 trackers.

Then mix the opt-out cookies with 10,000 cookies randomly sampled from the crawling of the top 5,000 websites as described above. These additional cookies are considered negative samples (i.e., non-opt-out cookies) because the crawling process did not perform any opt-out, i.e., assume the browser does not have any opt-out cookies unless the user explicitly opts out.

Stratified partitioning was then performed to split the dataset into training and test sets with a 70-30% ratio. The patterns are developed on the training set and evaluated on the test set. The final dataset contains 10,928 cookies with 7,649 and 3,279 samples in training and test sets, respectively. The number of samples and supports in the dataset are shown in Table 4.

TABLE 4

Opt-out cookie classifier performance on the training and test sets.

| Metric | Train | Test |
|---|---|---|
| Precision | 0.98 | 0.97 |
| Recall | 0.74 | 0.74 |
| F1 | 0.84 | 0.84 |
| Support | 649 | 279 |
| # Samples | 7,649 | 3,279 |

The matching rules comprise two types of patterns based on cookie names and cookie values. First, the patterns in cookie names include the spelling and abbreviation variants of "opt out", such as "opt-out" and "OptedOut". The abbreviation pattern "oo" does not simply match when it is a substring; it matches only if "oo" is either the whole string or surrounded by delimiters like "_". Exclude the cookies whose string values can be converted to False in common programming languages, such as 0 or false. For example, cookie optout=false does not indicate an opt-out. Second, a cookie is considered for an opt-out purpose if its name indicates a unique user ID, such as "uid" and "uuid", and its value is not unique such as a single-digit number like "−1" or "nan". These special values of a tracking cookie can be used to indicate the opt-out preference. It is worth noting that opt-out cookies must have both appropriate key and value, e.g., cookie named "uuid" is not an opt-out cookie until its value becomes "−1".

As shown in Table 4, the classifier achieves a high F1 score of 84% (97% precision and 74% recall) on the test set. As the dataset is highly unbalanced, these metrics are computed only for positive samples. The aim is to minimize the false detections (i.e., maximize precision), so consider the performance is good enough when the precision on the training set was greater than 95%. Conjecture that this high accuracy comes from the regularity of the naming of opt-out cookies created by programmers. It is worth noting that the OptOutCheck system does not recognize cookies with obfuscated names and values but this limitation does not increase the false-positive rate of the system.

OptOutCheck system also extracts the actual data-collection behavior of a tracker from its network traffic to detect the inconsistencies, if any, between its actual behavior and opt-out policies. That is, the consistency analyzer 53 analyzes the content of the cookies in relation to select statements of the privacy policy. Consider the data objects and purposes in the data-collection behavior of a tracker, which is formalized as follows: Definition 7.1 (Data Flow)—a data flow is a 3-tuple (r,d,p) where a recipient r collects a data object d for the receivers purpose p. The receivers of network traffic are determined by the destination hosts in the intercepted URLs. For example, the data sent to hosts owned by tracker T has the receiver r=T. A data object d is the data type transferred via the network, such as a "unique identifier" or "user location". A data-usage purpose p is the purpose of collecting and using the data object such as "for delivering OBA" or "for product research and analytics."

In order to extract key-value data pairs from cookies and URL parameters in the HTTP traffic, the OptOutCheck system addresses two challenges: 1) ensure captured traffic falls under the scope of the corresponding opt-out policies and 2) avoid cookies that are only stored in the browser but not transferred to the servers.

To analyze the data collection on opt-out choices, the OptOutCheck system may consider only cookies and URL parameters sent to the URLs that fall under the scope of opt-out policies. In particular, these URLs are the ones that match the domains of the tracker's opt-out cookies. Although the scope of opt-out choices may span beyond the opt-out cookies' domains, because a tracker must own the domain of an opt-out cookie, assume a data flow to follow the opt-out policy if its domain matches the top-level domain of an opt-out cookie, called an opt-out domain. For example, if the opt-out cookie is opt_out=1 under domain ads.tracker.com, the opt-out domain is .tracker.com. The domain matching follows the domain-match specification. Moreover, the longest matching URL paths take the precedence if there are multiple matched domains and paths found.

The OptOutCheck system intercepts the cookies and URL parameters transferred from a web browser to the trackers' servers in the HTTP requests made by the browser during each web page visit. By capturing the cookies transferred via network traffic, the data in the cookies is guaranteed to be collected by the trackers, rather than being only stored and unused in the browser. To determine the expiration time of the cookies intercepted in the HTTP requests which contain only the keys and values of the transferred cookies, they are resolved to the cookies stored in the browser by matching their names, values, domains, paths and request URLs. The HTTP request interception feature of the web browser automation tool is used such that the interception is performed before the traffic is encrypted in the HTTPS protocol.

From the extracted key-value pairs, OptOutCheck system infers the data objects d and data-usage purposes p of data-flow tuples formalized in Definition 7.1. For example, a data flow associated with the collection of a unique-ID cookie uid used by a tracker T is (T, uid, tracking). Since the automatic opt-out policy extractors extract only No-tracking and No-data-collection opt-out policies, one can focus on detecting the data types that reflect the tracking and data collection of a tracker as follows.

The OptOutCheck system detects the cookies that contain unique identifiers for tracking purposes. A data flow for such a tracking cookie is (<tracker>, unique ID, tracking) where <tracker> is the tracking cookie's owner. Unique IDs (known as unique user identifiers or tracking IDs) are widely used for tracking users.

For automatic detection of identifier cookies, one can assume cookies and URL parameters containing unique IDs are used for tracking purposes. While it is not possible to determine the ultimate usage purposes of these IDs without the information at the server side, unlike automatic data collection such as logging of IP addresses on HTTP servers, setting cookies and URL parameters requires significant effort, and hence the collection of such data is unlikely to be accidental. For example, the collection of cookie named uid containing a 16-digit identifier that does not change throughout a user's browsing activity is likely to track users by assigning each user with a unique user ID.

The OptOutCheck system determines a cookie to have a unique ID using a set of criteria that are empirically determined and evaluated by Englehardt et al. The heuristics leverage two main properties of a unique ID cookie—unique across browser instances and persistent over time. There are five criteria as follows. First, cookies are long-lived, i.e., their expiration time is longer than three months. This time threshold is the same as that in the work of Englehardt et al. Second, their values are constant throughout web browsing (i.e., visits to different websites by the same browser instance) to avoid varying non-ID values like timestamps and the browsing history. Third, the cookie values are of constant length across different measurements. Fourth, cookies have user-specific values which are unique among different browser instances. Finally, cookie values have high entropies, i.e., its values change significantly across measurements. A cookie is filtered out if the RatcliffObershelp-similarity score of its values in different measurements is higher than 0.55.

The OptOutCheck system parses and decodes URL parameters into key-value pairs in order to determine the data types collected by the trackers. As the values can be encoded in various data formats, the system attempts to decode the URL parameters and cookie values in JSON and base64 formats. The same heuristics of detecting unique IDs for cookies apply for URL parameters except the long-lived criterion as URLs do not have expiration time.

In addition to the unique IDs, the system detects the collection of other user data types such as location and web browsing history. Inspired by the bait technique, the system looks for the known values of the crawling servers' IP addresses, location (e.g., city and state names), browser/OS versions, and URLs of the visited web pages in the values of the extracted key-value pairs. Their existence is the indication of data collection by a tracker. For example, a tracker is collecting user location if its cookie contains a key-value pair region=<city_name> containing the name of the city where the crawling server is located.

Consistency between the policy statements and data flows from web browsers to trackers are analyzer by the consistency analyzer as follows.

The formal representations of opt-out policy statements (Definition 5.1) and data flows (Definition 7.1) are based on the concepts of receiving entities (i.e., receivers), data objects and purposes that have subsumptive relationships with each other. For example, a relation "personal data includes email addresses" translates to that email address is subsumed by personal data. The system leverages the subsumptive relationships in the ontologies of PolicyLint that are derived from subsumptive phrases of a large number of privacy policies. The relationship between the policy terms are formalized as follows. Definition 8.1 (Subsumptive Relationship)—concept x is subsumed by another concept y, denoted as $x_{-o}y$, if and only if $x_{-o}y$ and there is a path from y to x in an ontology o represented as a directed graph in which each node is a term and each edge points from a general term y to a specific term x included in y, i.e., x "is a" instance of y. Similarly, $x \sqsubseteq_o y \Leftrightarrow x_{-o} y \lor x \equiv_o y$.

Informally, a data flow is consistent with a privacy policy T which consists of a set of policy statements $t_s$, if there is a policy statement that discloses the data object and purpose of the data flow and there is no policy statement that discloses otherwise (e.g., uncollection of the data). The consistency condition is formalized as follows. Definition 8.2 (Flow-relevant Policy Statements)—a privacy statement $t_f = ((r_t, c_t, d_t), (e_t, k_t, q_t))$ is relevant to a flow $f = (r, d, p)$ (denoted as $t_f \approx f$) iff $\land r \sqsubseteq_p r_t \land d \sqsubseteq_\delta d_t \land p \sqsubseteq_k Pt$. Let $T_f$ be the set of the flow-f-relevant policy statements in the set of policy statements in the set of policy statements T of a privacy policy, then $T_f = \{t_f | t_f \in T \land t_f \approx f\}$; and Definition 8.3 (Flow-to-Policy Consistency)—a flow f is said to be consistent with a privacy policy T iff $\exists t_f \in T_f$ such that $c_t = collect \land k_t = for$ and $\not\exists t'_t \in T_f$ such that $c'_t = not\_collect \lor k'_t = not\_for$.

A data flow is inconsistent with a privacy policy if the Flow-to-Policy Consistency condition is not satisfied. For example, an opt-out policy ((ad_platform, collect, data), (data, not_for, tracking)) is inconsistent with a data flow (ad_platform, user_ID, tracking) when the ad platform still retains a user ID cookie uid=<unique_ID> for tracking users after an opt-out even though the opt-out policy states that they will cease their tracking practice.

For the sake of brevity, the definitions are for policy statements with a specified usage purpose. If the data usage purpose du of a policy statement is unspecified, i.e., du=None, the conditions on the data usage purpose are ignored during the checking.

The OptOutCheck system detects two types of consistency corresponding to the two opt-out policy classes. If the opt-out policy is No-tracking, the collection of unique IDs for tracking purposes after the user opted out is inconsistent. If the policy is No-data-collection, the collection of any data (such as unique ID, user location, web page URLs and IP address) is inconsistent.

The following theorem formalizes an inconsistency when a tracker still collects unique IDs for tracking purposes after users' opt-out. Theorem 8.4 (Unique-ID Tracking Inconsistency)—the collection of unique IDs for tracking purposes after users' opt-out is inconsistent with a No-tracking or No-data-collection opt-out policy.

For a large scale study, widely-used tracker lists were selected that provide the websites of trackers' owner companies and privacy policies to derive a tracker dataset. For demonstration purposes, the tracker databases used included WhoTracksMe, Disconnect Tracking Protection, Evidon Global Opt-out and DuckDuckGo Tracker Radar. These databases have 229-3,194 trackers as shown in Table 5 below. The WhoTracksMe database contains trackers from usage data collected via the Ghostery extension's users from May 2017 to March 2022.

TABLE 5

Sizes of the tracker databases.

| Tracker Database | # Trackers |
| --- | --- |
| WhoTracksMe | 3,194 |
| Disconnect | 1,393 |

TABLE 5-continued

Sizes of the tracker databases.

| Tracker Database | # Trackers |
| --- | --- |
| Evidon | 796 |
| DuckDuckGo | 229 |
| Merge | 4,021 |

The Disconnect database is created and updated by using manual reviews of trackers' scripts/privacy policies and error reports from the companies labeled as trackers. The Evidon Global Opt-out tool contained 796 trackers at the time of this writing. Finally, privacy-policy URLs of 229 trackers were extracted from the 2022 March crawl of the DuckDuckGo Tracker Radar database. Tracker domains in ad-blocking lists, such as EasyList, were not used because many of them were resolved to only file servers without obvious connection to the trackers' privacy policies. By uniquely identifying each tracker by its pay-level domain, merging the three selected lists yields a list of 4,021 unique trackers. The number of trackers the crawler successfully loads a home page is 3,319.

Finally, remove trackers with home pages redirected to the same web domains, leaving 2,981 trackers. This step is to avoid those ad platforms that provide multiple different ad services. For example, 29 home pages of Google ad services have the same google.com domain. Do not exclude non-English home pages at this stage to avoid the removal of multilingual trackers which may have a non-English home page but an English privacy policy. Table 6 below shows the number of trackers extracted throughout the filtering steps.

TABLE 6

Tracker-list filtering steps, starting from the merged tracker list.

| Filtering Step (Removal) | # Trackers |
| --- | --- |
| Fail-to-load pages | 3,319 |
| Duplicate home pages | 3,097 |
| Duplicate site domains | 2,981 |

From the selected 2,981 trackers, the Google Programmable Search Engine yielded 14,059 links for 71.72% (2,138/2,981). Only 2% of tracker websites disallowed the Google search engine by using robots.txt. Refining the search results to only the top-3 links and removing links to PDF files (e.g., PDF privacy policies) yielded 5,323 links for opt-out page candidates of 71.05% (2,118/2,981) trackers. Extracting opt-out buttons from the opt-out page candidates led to opting out 195 trackers, i.e., detected an opt-out button and found opt-out cookies after clicking the button. After excluding 30 trackers with non-English opt-out pages, the OptOutCheck system identified 265 opt-out cookies from 165 trackers. Using only the pattern-based classifier, it could still identify 254 opt-out cookies from 160 trackers, demonstrating the effectiveness of opt-out-cookie patterns. Table 7 shows the trackers after each opt-out choice extraction step.

The recall rate of the opt-out button extractor is evaluated by randomly selecting 50 trackers in the Tracker dataset and manually identifying the opt-out choices provided by these trackers. Of these, 10 trackers were found to provide opt-out buttons (other 4 trackers were excluded because their opt-out buttons led to nonexistent web pages or the policies were not written in English). The opt-out button extractor extracted 5 buttons with a precision of 100% and a recall rate of 50%. The majority of the missing cases were due to the opt-out buttons required multiple steps to active such as visiting another web page, clicking a checkbox, and submitting the opt-out.

TABLE 7

| Extraction/Analysis Step | #Trackers |
| --- | --- |
| Have opt-out page links | 2,118 |
| Successfully opted out | 195 |
| Have English opt-out pages | 165 |
| Opt-out policies extracted | 42 |
| Data flow extracted | 33 |
| Inconsistencies detected | 11 |

The OptOutCheck system found sentences related to opt-out policies in most of the 165 trackers with an English opt-out web page. Specifically, the system analyzed 1,369 opt-out-related sentences in the privacy policies of 152 trackers. It then extracted 55 opt-out policies from 54 sentences of 42 trackers (a tracker may contain multiple policy statements). The most common policy class is No-data-collection with 26 trackers.

Two authors of this disclosure manually verified the extracted policies that were unseen by the opt-out classifiers in the training set. The results show that the classifiers achieved high precision rates of 84.62% (22/26) and 85.19% (23/27) for the No-tracking and No-data-collection classes, respectively. Table 8 shows the policy classification results.

TABLE 8

| Policy Class | #Sentences (#Trackers) | Precision |
| --- | --- | --- |
| No-tracking | 27 (21) | 84.6% |
| No-data-coll. | 28 (26) | 85.2% |
| Total | 54 (42) | |

For extraction of data flows, the differences of cookies on publisher websites were analyzed between before and after opting out of a tracker T to detect the changes in the data-collection behavior of T. This process avoids false positives due to the cookies set by the tracker's own website when the OptOutCheck system visited it for opting out. These cookies may entail first-party data collection of T that is unrelated to T's third-party tracking services. Specifically, the OptOutCheck system first visits a set of publisher websites using a clean instance of a web browser and records the set $T_C$ of cookies under T's opt-out domains. It then visits the tracker's website and activates the opt-out choices provided by T. The OptOutCheck system confirms that the opt-out has been set successfully by checking the presence of the tracker's opt-out cookies. Finally, the OptOutCheck system visits publisher websites again and records the values of the cookies in $T_C$.

Due to the randomness of placement of online advertisements, the OptOutCheck system sequentially visits a set of candidate web pages S until it finds 10 web pages that send requests containing the cookies of T, or S is exhausted. The WhoTracksMe and DuckDuckGo Tracker Radar cookie databases that contain the lists of trackers detected on top websites are used to generate S for each tracker.

Of the 165 trackers with opt-out buttons, the OptOutCheck system found 129,286 candidate websites for 146 trackers where their cookies may have been placed. Each tracker has an average of 582 (SD 1,026) candidate websites.

Following the measurement procedure above, the OptOutCheck system scanned 476 websites and extracted 52 data flows from 4,341 for 33 trackers. Unique identifiers are the most common data type and found on 98% of the flows. The other data type is the information about the user's IP address and city name included in cookie geode of udmserve.com.

The OptOutCheck system detected 11 trackers that had conducted tracking and data collection inconsistently with their opt-out policies after activating the opt-out choices. Two authors independently verified the results by manually following the measurement procedure and checking the existence of tracking cookies using Chrome DevTools. The purposes of cookies was determined from cookie names, values and cookie description (if there is any). All of the detected inconsistencies were confirmed to be correct. Although the number of the detected inconsistent trackers is low, they tracked a significant amount of web traffic while the inconsistencies are direct violations of the trackers' privacy policies. On average, each tracker was present at 0.64% (SD 1.27%) across all page loads and on 3.65% (SD 6.57%) of the top 10,000 websites where they were included as a third-party in March 2022. Given that there were 4.95 billion Internet users, these inconsistencies might affect a significant number of users.

Criteo, which was present on 21% of the top 10,000 websites, contains multiple statements describing how its opt-out choice works, such as "disable Criteo services will result in the deletion of the cookies dropped by Criteo in your browser you are currently using that allows us to recognize your browser or device" and "the termination of the collection of your personal data." Therefore, the opt-out policies are No-tracking and No-data-collection. However, after clicking "disable Criteo services" and the opt-out cookie optout=1 was set, cookie uid was still retained with a unique ID. Both of these cookies were under .criteo.com domain. Underdog Media instructed users to "opt out of our Underdog Media hosted technology by clicking here." After clicking the opt-out button, the website confirmed the status of "opt-out for Underdog Media hosted 3rd Party Cookies." Therefore, this opt-out policy was classified as No-data-collection. The button set an opt-out cookie optout=Thank_You but the tracker still retained multiple cookies to collect data from users. One of the cookies was geode that contained the IP address and city name of the browser.

As another example, adtriba.com instructed users that "to be excluded from Adtriba third party tracking, you can click the following button." This opt-out policy was classified as No-tracking. However, users even with an opt-out cookie atboptout=1 were still tracked. The tracker still retained an atbgdid cookie that contains a device ID. This cookie was under .adtriba.com domain and existed on publisher websites even before our visit to adtriba.com for opting out, so it was likely used for third-party tracking purposes. However, because the policy is No-tracking, one expects all tracking cookies to be removed after an opt-out.

The inconsistencies could be due to an incomplete/buggy implementation of opt-out choices since trackers might not always develop and test this feature completely. In all the detected inconsistencies, the opt-out cookies were successfully set after clicking the opt-out button, demonstrating that the trackers made an effort to record the opt-out preferences. However, the tracking cookies were still retained, so one can hypothesize that the trackers are not successful at making the opt-out choice fully functional.

Since the trackers have incentives to keep users from opting out of their tracking, they might also attempt to make the opt-out process unnecessarily complex for the end-users. It was found that three trackers in the detected inconsistencies did not automatically delete their tracking cookies. For example, criteo.com retained uid cookie after an opt-out although the cookie did not reappear after its deletion. However, since many trackers automatically deleted their tracking cookies upon opt-out, there should not be any difficulty of automatic deletion of a tracker's own cookies. Therefore, it is unreasonable to require average end-users to open Chrome DevTools to manually search and delete the tracking cookies while retaining the necessary opt-out cookies.

Regardless whether the inconsistencies were accidental bugs or deliberately created by the trackers to mislead the users, since the opted-out users revoked their consent of tracking and/or data collection, the tracker companies conducted inconsistent data practices without the opted-out users' consent. Therefore, the companies may face heavy fines from regulators due to the deceptive privacy practices and unlawful data collection. It is a tracker's responsibility to ensure the consistency between its stated privacy policy and the actual data practices of its services. Given the detection of such inconsistencies by the OptOutCheck system, the trackers, developers and regulators can investigate and resolve their root causes.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for detecting non-compliance with an opt-out decision of a user, comprising:
    detecting, by a policy extractor, a user interface element on a webpage associate with a given online tracking entity, where the user interface element enables a user to opt-out of having data collected by the given online tracking entity;
    performing, by a data flow analyzer, opt-out for a given user using the detected user interface element;
    identifying, by the policy extractor, select statements of a privacy policy for the given online tracking entity by analyzing webpages associated with the given online tracking entity, where the select statements specify data practices in response to an opt-out decision;
    detecting, by a data flow analyzer, transfer of one or more cookies from a web browser operated by the given user to a server, where the one or more cookies are transferred after the opt-out and the server is associated with the given online tracking entity;
    analyzing, by a consistency analyzer, content of the one or more detected cookies in relation to the select statements of the privacy policy; and
    notifying, by the consistency analyzer, the given user of a violation of the privacy policy in response to determining an inconsistency between the content of the one or more detected cookies and the select statements of the privacy policy, where the policy extractor, the data flow analyzer and the consistency analyzer are implemented by computer executable instructions executed by a computer processor.

2. The method further comprises receiving a request from the user to check compliance of opt-out decisions and performing the steps of claim 1 in response to receiving the request from the user.

3. The method of claim 1 wherein detecting a user interface element is based on attribute values of HTML elements.

4. The method of claim 1 wherein identifying select statements of a privacy policy includes classifying the select statements as having one of no tracking of the user clause or no data collection from the user clause.

5. The method of claim 4 wherein classifying the select statements further comprises
   extracting a predicate from the privacy policy, where the predicate describes an action that a user takes for opting out,
   identifying an opt out clause in the privacy policy as a clause having a grammatical relationship with the predicate,
   parsing the opt out clause into a set of features, and
   classifying the opt out clause using the set of features.

6. The method of claim 1 wherein performing an opt-out for a given user further comprises
   simulating a click of the detected user interface element,
   detecting a non-erroneous change of a webpage in response to the click, and
   detecting creation of opt-out cookies by the given online tracking entity in response to the click, where the opt-out cookies reside on the computing device hosting the web browser.

7. The method of claim 1 wherein analyzing the content of the one or more detected cookies further comprises determining whether a given cookie contains a unique user identifier and notifying the given user of a violation of the privacy policy in response to a determination that the given cookie contains a unique user identifier.

8. The method of claim 1 further comprises deleting the one or more detected cookies from the computing device hosting the web browser in response to determining an inconsistency between the content of the one or more detected cookies and the privacy policy.

9. A computer-implemented method for detecting non-compliance with an opt-out decision of a user, comprising:
   identifying, by the policy extractor, select statements of a privacy policy for a given online tracking entity by analyzing webpages associated with the given online tracking entity, where the select statements specify data practices in response to an opt-out decision;
   detecting, by a data flow analyzer, transfer of one or more cookies from a web browser operated by the given user to a server, where the one or more cookies are transferred after an opt-out decision by the given user and the server is associated with the given online tracking entity;
   analyzing, by a consistency analyzer, content of the one or more detected cookies in relation to the select statements of the privacy policy; and
   notifying, by the consistency analyzer, the given user of a violation of the privacy policy in response to determining an inconsistency between the content of the one or more detected cookies and the select statements of the privacy policy, where the policy extractor, the data flow analyzer and the consistency analyzer are implemented by computer executable instructions executed by a computer processor.

10. The method of claim 9 wherein identifying select statements of a privacy policy includes classifying the select statements as having one of no tracking of the user clause or no data collection from the user clause.

11. The method of claim 10 wherein classifying the select statements further comprises
    extracting a predicate from the privacy policy, where the predicate describes an action that a user takes for opting out,
    identifying an opt out clause in the privacy policy as a clause having a grammatical relationship with the predicate,
    parsing the opt out clause into a set of features, and
    classifying the opt out clause using the set of features.

12. The method of claim 9 wherein analyzing the content of the one or more detected cookies further comprises determining whether a given cookie contains a unique user identifier and notifying the given user of a violation of the privacy policy in response to a determination that the given cookie contains a unique user identifier.

13. The method of claim 9 further comprises deleting the one or more detected cookies from the computing device hosting the web browser in response to determining an inconsistency between the content of the one or more detected cookies and the privacy policy.

14. A non-transitory computer-readable medium having computer-executable instructions that, upon execution of the instructions by a processor of a computer, cause the computer to:
    identify select statements of a privacy policy for a given online tracking entity by analyzing webpages associated with the given online tracking entity, where the select statements specify data practices in response to an opt-out decision;
    detect transfer of one or more cookies from a web browser operated by the given user to a server, where the one or more cookies are transferred after an opt-out decision by the given user and the server is associated with the given online tracking entity;
    analyze content of the one or more detected cookies in relation to the select statements of the privacy policy; and
    notify the given user of a violation of the privacy policy in response to determining an inconsistency between the content of the one or more detected cookies and the select statements of the privacy policy.

15. The non-transitory computer-readable medium of claim 14 wherein select statements of a privacy policy are identified by classifying the select statements as having one of no tracking of the user clause or no data collection from the user clause.

16. The non-transitory computer-readable medium of claim 14 wherein the select statements are classified by
    extracting a predicate from the privacy policy, where the predicate describes an action that a user takes for opting out,
    identifying an opt out clause in the privacy policy as a clause having a grammatical relationship with the predicate,
    parsing the opt out clause into a set of features, and
    classifying the opt out clause using the set of features.

17. The non-transitory computer-readable medium of claim 14 wherein the content of the one or more detected cookies is analyzed by determining whether a given cookie contains a unique user identifier and notifying the given user of a violation of the privacy policy in response to a determination that the given cookie contains a unique user identifier.

18. The non-transitory computer-readable medium of claim 14 wherein the one or more detected cookies from the computing device hosting the web browser are deleted in response to determining an inconsistency between the content of the one or more detected cookies and the privacy policy.

\* \* \* \* \*